United States Patent
Boock

(10) Patent No.: US 6,815,044 B2
(45) Date of Patent: Nov. 9, 2004

(54) MULTILAYER PANEL WITH AN IMPROVED NOISE DAMPING

(75) Inventor: Klaus Boock, Timmdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/621,106

(22) Filed: Jul. 15, 2003

(65) Prior Publication Data

US 2004/0058131 A1 Mar. 25, 2004

(30) Foreign Application Priority Data

Jul. 15, 2002 (DE) .......................................... 102 31 791

(51) Int. Cl.[7] .............................. B32B 3/00; E04B 1/82; E04C 2/54
(52) U.S. Cl. ........................ 428/172; 428/166; 428/167; 428/212; 181/293; 52/787.11
(58) Field of Search ................................. 428/138, 166, 428/167, 172, 188, 212; 181/284, 293; 52/787.11, 793.1

(56) References Cited

U.S. PATENT DOCUMENTS

| 4,248,647 A | 2/1981 | Herron et al. |
| 4,317,503 A | 3/1982 | Sooderquist et al. |
| 4,353,433 A | 10/1982 | Mohrenstein-Ertel et al. |
| 4,560,028 A | 12/1985 | Perret |
| 5,509,247 A * | 4/1996 | Fortez et al. .................. 52/630 |
| 5,543,198 A | 8/1996 | Wilson |
| 6,033,756 A * | 3/2000 | Handscomb ................ 428/138 |
| 6,065,717 A | 5/2000 | Boock |
| 6,179,086 B1 | 1/2001 | Bansemir et al. |

FOREIGN PATENT DOCUMENTS

| DE | 4126781 | 2/1993 |
| DE | 9408118 | 10/1995 |
| DE | 19527081 | 9/1996 |
| DE | 10034990 | 2/2002 |

* cited by examiner

Primary Examiner—Donald J. Loney
(74) Attorney, Agent, or Firm—W. F. Fasse; W. G. Fasse

(57) ABSTRACT

The acoustic characteristics of lightweight multilayer construction panels have been improved by the formation of three-dimensionally meandering curved slots or rows of slot sections in the core of the panels. The slot depth varies along the length of the curved slots. The slots or rows of slots are spaced from each other by an on-center spacing that is preferably constant along the length of the slots.

21 Claims, 2 Drawing Sheets

MULTILAYER PANEL WITH AN IMPROVED NOISE DAMPING

PRIORITY CLAIM

This application is based on and claims the priority under 35 U.S.C. §119 of German Patent Application 102 31 791.7, filed on Jul. 15, 2002, the entire disclosure of which is incorporated herein by reference.

FIELD OF THE INVENTION

The invention relates to multilayer panels for use as wall coverings, space dividers, or ceiling panels with improved acoustics.

BACKGROUND INFORMATION

Multilayer panels are used in the construction of conveyances, such as ships and passenger trains and aircraft, as cabin dividers, wall coverings or wall linings and as ceiling panels. Multilayer panels have a core enclosed between at least two cover layers. The core is either a foam structure or a honeycomb structure with empty or foam-filled honeycomb cells that may have different cross-sectional configurations. The cores may also be multilayer laminated structures. The cover layers are made of materials having a high tensile strength. Conventional panels do not have satisfactory acoustic characteristics. More specifically, such panels have a low noise transmission loss, and a high structure borne noise radiation.

The prior art discussed below does not show efforts to solve these problems in combination.

German Patent Publication DE 41 26 781 A1 discloses multilayer panels constructed as described above. The panels are provided with straight parallel slots in the core for improving the pliability or flexibility or bendability in one direction. The slots have a defined width, a uniform slot spacing, and the slot depth ranges from 80 to 95% of the core thickness to form a lightweight, bendable panel. Such lightweight panels are quite flexible, but their acoustic characteristics leave room for improvement.

German Patent Publication 195 27 081 C1 discloses a lightweight construction panel, for example for making roll-up doors, that must be flexible in opposite directions. For this purpose two slotted panels are combined. Each panel is constructed as described above with a core, two cover layers and straight slots in the core. An intermediate layer between the two combined panels improves a relative sliding ability between the two assembled panels. Acoustic characteristics are neither mentioned nor suggested.

A panel construction similar to the above described panels is disclosed in German Patent Publication DE 100 34 990 A1 in which the slots extend in two directions in the core, thereby forming a slotted rectangular grid structure in the core, without penetrating the core, for improving the acoustic characteristics, particularly for reducing noise radiations.

The above described conventional panels have a mechanical strength problem, because cracks and even breaks occur quite often, presumably due to the straight slots. Specifically, the cover layer positioned on the compression side of a bent panel breaks easily in response to bending, whereby the respective cover layer breaks into one or more slots. This phenomenon is known as "trench break" which must be avoided.

OBJECTS OF THE INVENTION

In view of the foregoing it is the aim of the invention to achieve the following objects singly or in combination:

to improve the acoustic characteristics of lightweight construction panels by increasing their noise transmission loss and decreasing their structure borne noise radiation.

to avoid the above mentioned trench breaks in acoustically improved lightweight construction panels;

to improve the acoustic characteristics of the panels by using slots in the core without decreasing the crash load capacity of the panel; and to form slot configurations and slot patterns in the core of the panel for improving the acoustic panel characteristics without impairing the strength of these panels.

SUMMARY OF THE INVENTION

According to the invention there is provided a multilayer panel comprising a core having first and second base surfaces, at least a first ply covering said first base surface and at least one second ply covering said second base surface, a first plurality of curved slots extending in a first direction in said core, a second plurality of curved slots extending in a second direction in said core, said first and second directions crossing each other at angles other than right angles, and wherein said first plurality of curved slots and said second plurality of curved slots comprise curvatures curved in space, so that first slots of said first plurality of slots have a first spacing from one another, so that second slots of said second plurality of slots have a second spacing from each other, and so that said first and second slots have a varying slot depth within said core.

An important advantage of the invention is seen in that lightweight panels constructed as taught herein achieve simultaneously, in addition to their light weight, two desirable features, namely an acceptable mechanical strength in spite of having a slotted core and desirable acoustic characteristics. Conventional straight slots that cross each other are good for improving acoustic characteristics, but bad with regard to mechanical panel characteristics. The invention solves this problem by avoiding conventionally shaped slots in the present panels with specially curved slots, slot configurations and slot patterns in the panel cores.

BRIEF DESCRIPTION OF THE DRAWINGS

In order that the invention may be clearly understood, it will now be described in detail in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
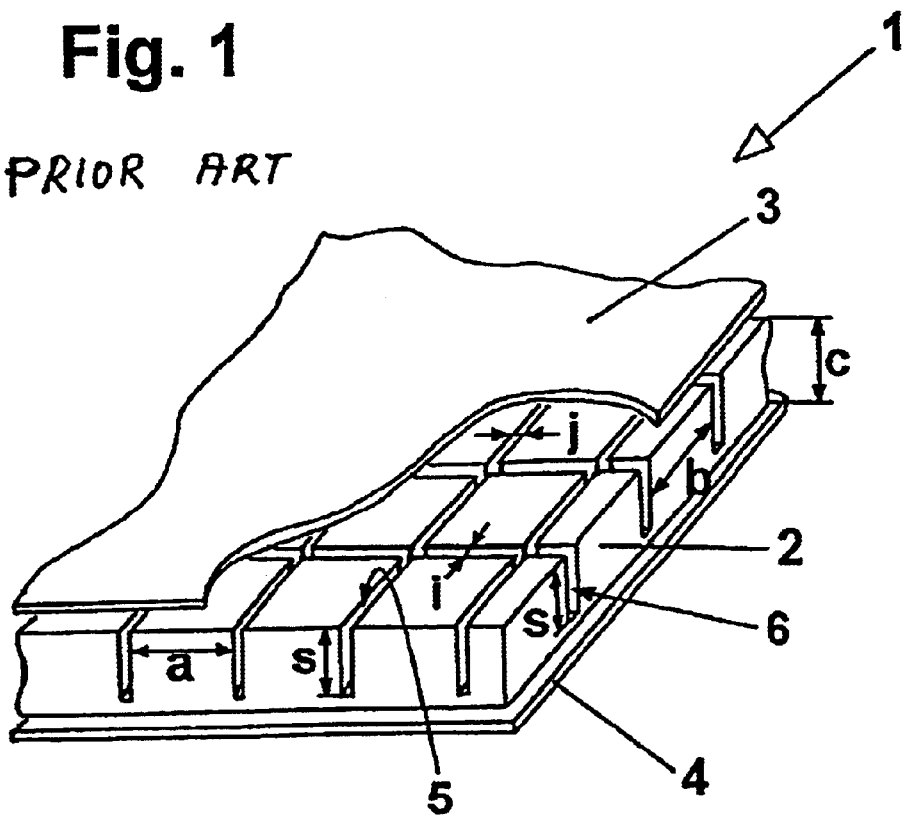
FIG. 1 shows a perspective view of a conventional straight slotted wall panel according to German Patent Publication DE 100 34 990 A1.
Figure 2:
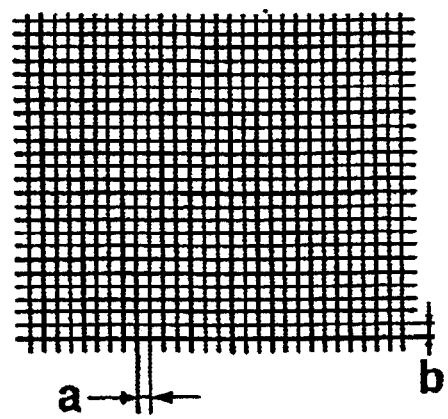
FIG. 2 shows a plan view of the panel of FIG. 1 with a cover layer removed to illustrate the slot grid structure.

FIG. 1 shows a panel 1 with a conventionally slotted core 2, enclosed between cover layers or plies 3 and 4. The core has a thickness c and a plurality of slots 5 and 6. All slots 5 and 6 are straight slots each having a constant slot depth s. All slots 5 extend in parallel to each other in one direction and have a slot width j and a slot spacing a. All slots 6 have a slot width i and a slot spacing b. All slots 6 extend in parallel to each other in a direction crossing the first direction of slots 5 at right angles. Thus, all slots 5 and 6 form a slotted orthogonal grid structure as shown in FIG. 2. The slots 5, 6 also extend with their slot depth s orthogonally to planes defined by the cover layers 3, 4 and the core 2. The slots 5, 6 are formed by known methods, for example by molding or milling, and do not extend entirely through the core 2. Thus, the depth s of the slots 5, 6 is smaller than the core thickness c.

The slot spacings a and b, the core thickness c, the slot widths i and j, and the slot depth s may change from panel to panel for achieving a desired panel bending capability and core shearing strength. The slot depth in any given core does not vary along a slot length. Compared to other conventional panels, the panel of FIGS. 1 and 2 provides with its rectangular slot grid structure a substantially increased noise damping and reduction in a noise radiation. However, the panel of FIGS. 1 and 2 leaves room for further improving the acoustics, the strength, the pliability and the flexibility characteristics of such construction panels.

Figure 3:
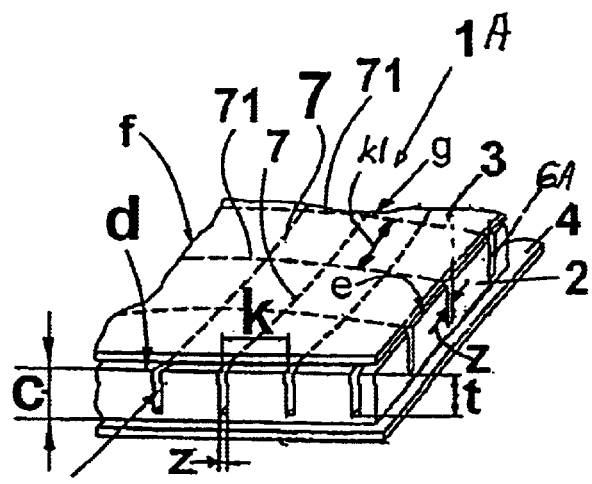
FIG. 3 shows a perspective view of a slotted panel with curved slots according to the invention having a core constructed with curved slot patterns forming a curved grid structure.
Figure 6:
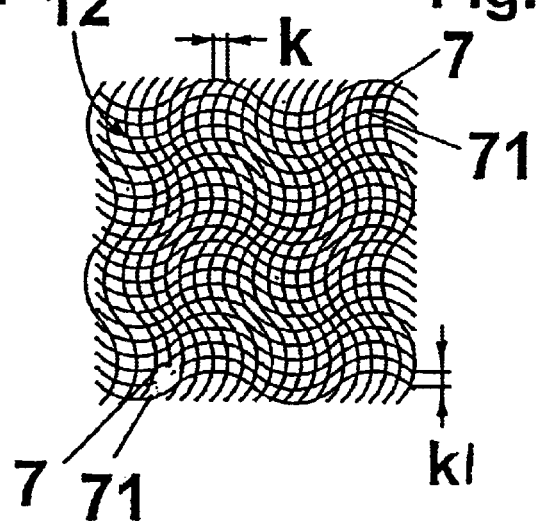
FIG. 6 shows a top plan view of a panel core, with the tops cover ply removed, slotted according to the invention, wherein each curved line is a slot line and represents a slot and all slots together form a curved grid structure.

FIGS. 3 to 6 illustrate an improved panel 1A constructed according to the invention. The panel 1A also has a core 2 with a core thickness c and cover layers or plies 3 and 4. The similarity ends here because slots 5A and 6A shown in FIG. 3 are curved slots, while the conventional slots 5 and 6 are straight. The slots 5A and 6A are only shown at the edges of the core 2 in FIG. 3. Within the core 2 the curved slots 5A are represented by on-center slot lines 7 which extend in a first direction. Similarly, the curved slots 6A are represented by on-center slot lines 71 in the core 2 and extend in a second direction. Thus, the illustration is simplified. The slot lines 7 and 71 are curved just as the respective curved slots 5A, 6A, which these lines 7, 71 represent as best seen in FIG. 6. The slot lines 7 have an on-center spacing k from each other. The slot lines 71 have an on-center spacing k1 from each other. These on-center spacings k and k1 may be equal to each other, or they may differ from each other. These spacings may be constant or they may vary in any particular panel. In all instances the cross-over or intersection angles at intersections 12 differ from right angles as best seen in FIG. 6. Preferably, the on-center spacings k, k1 remain equal to each other and constant between two neighboring slot lines from edge to edge of the core 2.

The slots 5A, 6A extend with their slot depths t perpendicularly to a plane extending in parallel to the cover plies or layers 3 and 4 and thus to a core plane parallel to the cover plies 3, 4. The core 2 also has side edges d, e, f and g. Edges e and f extend in parallel to each other. Edges d and g extend in parallel to each other. The slot depth t is smaller than the core thickness c. Thus, the curved slots 5A, 6A do not penetrate the core 2. According to the invention the slot depth t is varying along the slots 5A, 6A from core edge to core edge. However, a slot width z, measured between slot walls perpendicularly to these slot walls and parallel to the above mentioned core plane, remains preferably constant in both slots 5A and 6A, in any particular panel embodiment. Alternatively, the slot widths z may vary and preferably assume any value within the range of e.g. 40 to 60 mm along a slot length. Thus, the slot width z may also vary along any particular slot or from slot to slot. In all instances the curved slots are preferably formed in the core 2 by milling, casting, molding or the like.

FIG. 3 further shows that the slots 5A, 6A as represented by their slot lines 7, 71 extend from edge to edge of the core 2. Thus, the slots are not interrupted along their entire length. However, slot sections arranged in a row are also feasible for improving the panel characteristics, especially the acoustic characteristics. The slots 5A extend form the core edge d to the core edge g. The slots 6A extend from the core edge e to the core edge f. The core edges f and g are shown in FIG. 3 at the respective broken away edges of the core 2 because FIG. 3 shows only a corner portion of the entire core or panel. Actually, the edges f and g are positioned at the respective unbroken panel edges.

It has been found not to be necessary to form the slots 5A, 6A in the entire core body. Placing the slots only in a certain small core area or in a predominantly larger core area that covers more than 50% of the core area, is also effective for achieving the required acoustic improvements by increasing noise absorption and decreasing structure borne noise radiation and improving the damping characteristics. Thus, depending on the intended use the proportion of slot covered area to not slot covered area may vary from a small coverage of, for example 25% to a full 100% surface coverage.

In all instances the slot covered areas form preferably, but not necessarily, a hill and valley topography that contributes to the improvement of the acoustic characteristics.

Figures 4, 5:
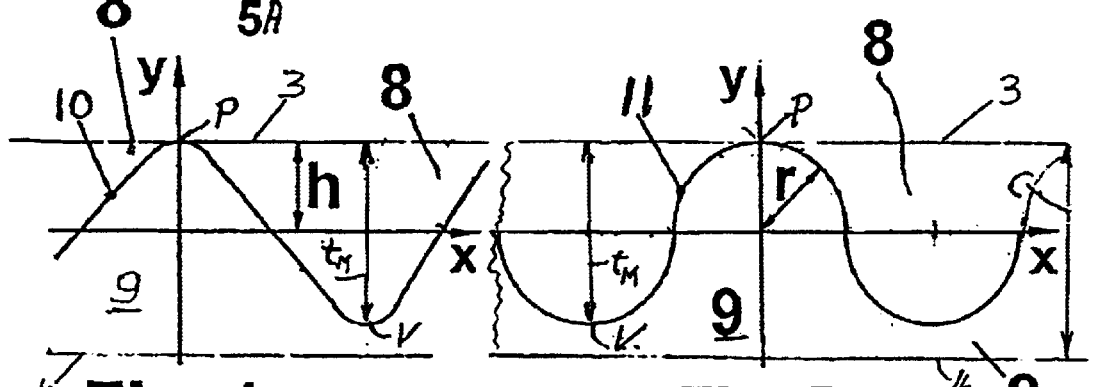
FIG. 4 shows a first example of a three dimensionally meandering slot curvature projected into the plane of the drawing sheet.
FIG. 5 shows a second example of a three dimensionally meandering slot curvature projected into the plane of the drawing sheet.

FIGS. 4 and 5 illustrate two different types of slot configurations shown as curves 10 and 11 which are projected into the plane of the drawing sheet to simplify the illustration. In reality these curves 10 and 11 meander three-dimensionally in the plane of the drawing sheet as shown in FIGS. 4 and 5 and into the space in front and in back of the drawing sheet as illustrated by the slot lines 7 and 71 as seen in FIG. 6. The ordinate y of the coordinate system shown in FIGS. 4 and 5 extends perpendicularly to the planes defined by the cover layers or plies 3 and 4. The abscissa x extends perpendicularly to the core edges d–g or to the core edges e–f shown in FIG. 3. The coordinate system is merely used to facilitate the orientation.

In both FIGS. 4 and 5 the areas above the curves 10 and 11 and below the cover ply 3 show slot sections 8. The areas 9 below the curves 10 and 11 and above the bottom ply 4 show the material of the core 2. The curves 10 and 11 represent the slot bottom of the slot sections 8. In FIG. 4 the bottom of the slot sections 8 is defined by parabola tips which preferably have a constant height h measured from a peak P. The parabola tips face sequentially in opposite directions. In FIG. 5 the bottom of the slot sections 8 are defined by semicircles preferably having a constant radius r and also facing or curving sequentially in opposite directions. The slot depth t varies along the curves 10 and 11. The slot depth t reaches its maximum $t_M$ at curve valleys V and its minimum at curve peaks P of the curves 10 and 11 respectively. Actually, in the examples of FIGS. 4 and 5 the slot depth t is zero at the peaks P and the slot sections 8 are arranged in curved rows along the slot lines 7 and 71 shown in FIG. 6. In these examples for the slot formations by the slot sections 8 the slots are actually interrupted where the slot depth is zero at the peaks P. However, uninterrupted slots may alternatively be formed by changing the tip height h or the radius r so that the peaks P of the curves 10 and 11 will not reach the cover ply 3. In all embodiments the valleys V will not reach the bottom cover layer 4 of the core 2. The core bottom will not be interrupted by any slots.

The width z of the slots 5A and 6A and of the slot sections 8 is preferably constant in any particular panel. However, the slot width z may vary in different panel types depending on their intended use. A slot width range of e.g. 40 to 60 mm is practically feasible, as mentioned above.

Panels incorporating the slot configurations according to the invention have the following advantageous features. The slot formations substantially reduce noise including structure borne noise radiation. Noise damping is improved. Due to the three-dimensional meandering of the slots or rows of slot sections 8, the above mentioned trench breaks are avoided. The selection of the core thickness c and of the thickness of the cover layers 3, 4 also influences the mechanical characteristics. A thicker core 2 may require thinner cover layers 3, 4 and vice versa. The varying slot depth t in the panel core improves the acoustics characteristics. Thus, indirectly the core thickness also influences the acoustics characteristics because the core thickness c limits the size of the slot depths variation, since the maximum slot depth $t_{MAX}$ must be smaller than the core thickness c so that the slots do not pass entirely through the core. The panel weight has also been reduced by the slots which is an added advantage particularly when these panels are used in the aircraft construction. Curved slots of comparable dimensions provide more empty space than straight slots.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A multilayer panel comprising a core having first and second base surfaces, at least a first cover ply covering said first base surface and at least one second cover ply covering said second base surface, a first plurality of curved slots extending in a first direction in said core, a second plurality of curved slots extending in a second direction in said core, said first and second directions crossing each other at angles other than right angles, and wherein said first plurality of curved slots and said second plurality of curved slots comprise curvatures curved in space, so that first slots of said first plurality of slots have a first spacing (k) from one another, so that second slots of said second plurality of slots have a second spacing (k1) from each other, and so that said first and second slots have a varying slot depth (t) within said core (2).

2. The multilayer panel of claim 1, wherein said first spacing (k) and second spacing (k1) are on-center spacings between neighboring curved slots.

3. The multilayer panel of claim 1, wherein said curved slots have a three-dimensionally meandering wavy configuration with peaks (P) and valleys (V) so that said varying slot depth (t) reaches its maximum depth ($t_M$) in said valleys (V).

4. The multilayer panel of claim 1, wherein said curved slots extend uninterrupted from one edge of said multilayer panel to an opposite edge of said multilayer panel.

5. The multilayer panel of claim 1, wherein said curved slots comprise curved slot sections arranged in rows thereby forming said curved slots.

6. The multilayer panel of claim 5, wherein said curved slot sections have a waveform with said varying slot depth (t) reaching a maximum slot depths ($t_N$) in valleys (V) of said waveform and a minimum slot depth at peaks (P) of said waveform.

7. The multilayer panel of claim 6, wherein said minimum slot depth of said curved slot sections is zero at said peaks so that said peaks contact a respective cover ply of said first and second cover plies.

8. The multilayer panel of claim 1, wherein said first and second spacings (k, k1) between neighboring curved slots have a constant length.

9. The multilayer panel of claim 1, wherein said first and second spacings (k, k1) between neighboring curved slots have individual different spacing lengths.

10. The multilayer panel of claim 1, wherein each of said base surfaces of said core has a given total surface area and wherein said curved slots are taking up a portion of said total surface area.

11. The multilayer panel of claim 1, wherein said core has a given core thickness (c), and wherein said varying slot depth (t) is smaller than said given core thickness.

12. The multilayer panel of claim 1, wherein said curved slots have a slot width (z) that is sufficiently small relative to said varying slot depth (t) for preventing trench breaks in said panel.

13. The multilayer panel of claim 1, wherein said curved slots have a slot width (z) that varies along a respective slot.

14. The multilayer panel of claim 13, wherein said slot width (z) varies within a range of e.g. 40 to 60 mm.

15. The multilayer panel of claim 1, wherein said curved slots have a slot bottom curvature (10) formed of parabola tips arranged in a respective row.

16. The multilayer panel of claim 15, wherein said parabola tips point alternately in opposite directions along said respective row.

17. The multilayer panel of claim 15, wherein said parabola tips have a height h, measured from a peak (P), of about 50 mm.

18. The multilayer panel of claim 1, wherein said curved slots have a slot bottom curvature (11) formed of semicircles arranged in a respective row.

19. The multilayer panel of claim 18, wherein said semicircles curve alternately in opposite directions along said respective row.

20. The multilayer panel of claim 18, wherein said semicircles have a radius of about 50 mm.

21. The multilayer panel of claim 1, wherein all curved slots have a constant slot width (z) independently of said varying slot depth (t).

* * * * *

UNITED STATES PATENT AND TRADEMARK OFFICE
CERTIFICATE OF CORRECTION

PATENT NO. : 6,815,044 B2
DATED : November 9, 2004
INVENTOR(S) : Boock

It is certified that error appears in the above-identified patent and that said Letters Patent is hereby corrected as shown below:

Title page,
Item [56], References Cited, U.S. PATENT DOCUMENTS, replace
"4,317,503 A  3/1982  Sooderquist et al.", by
-- 4,317,503 A  3/1982  Soederquist et al. --

Column 6,
Line 9, after "depths", replace "$(t_N)$", by -- $(t_M)$ --.

Signed and Sealed this

First Day of March, 2005

JON W. DUDAS
*Director of the United States Patent and Trademark Office*